US012159290B2

(12) United States Patent
Fyfe

(10) Patent No.: US 12,159,290 B2
(45) Date of Patent: Dec. 3, 2024

(54) SELF-CHECKOUT CUSTOMER EMOTION CORRELATION PROCESSING

(71) Applicant: NCR Voyix Corporation, Atlanta, GA (US)

(72) Inventor: Conor Michael Fyfe, Carnoustie (GB)

(73) Assignee: NCR Voyix Corporation, Atlanta, GA (US)

( * ) Notice: Subject to any disclaimer, the term of this patent is extended or adjusted under 35 U.S.C. 154(b) by 245 days.

(21) Appl. No.: 17/743,570

(22) Filed: May 13, 2022

(65) Prior Publication Data
US 2023/0368219 A1 Nov. 16, 2023

(51) Int. Cl.
| | |
|---|---|
| *G06Q 10/00* | (2023.01) |
| *G06Q 20/18* | (2012.01) |
| *G06Q 30/0201* | (2023.01) |
| *G06V 10/70* | (2022.01) |
| *G06V 40/16* | (2022.01) |

(52) U.S. Cl.
CPC ......... *G06Q 30/0201* (2013.01); *G06Q 20/18* (2013.01); *G06V 10/70* (2022.01); *G06V 40/174* (2022.01)

(58) Field of Classification Search
None
See application file for complete search history.

(56) References Cited

U.S. PATENT DOCUMENTS

| | | | |
|---|---|---|---|
| 8,010,402 B1 * | 8/2011 | Sharma | G06Q 99/00 |
| | | | 705/7.29 |
| 10,607,116 B1 * | 3/2020 | Omer | G06Q 10/06393 |
| 11,481,751 B1 * | 10/2022 | Chaubard | G06V 10/82 |
| 2004/0059614 A1 * | 3/2004 | Brown | G07C 11/00 |
| | | | 705/346 |
| 2012/0030006 A1 * | 2/2012 | Yoder | G06Q 30/0207 |
| | | | 705/14.41 |
| 2012/0239928 A1 * | 9/2012 | Judell | H04L 9/3271 |
| | | | 713/168 |

(Continued)

OTHER PUBLICATIONS

I Cohen, S Zhang, M Goldszmidt, J Symons et al. (Capturing, indexing, clustering, and retrieving system history), ACM SIGOPS . . . , 2005—dl.acm.org. (Year: 2005).*

(Continued)

*Primary Examiner* — Hafiz A Kassim
(74) *Attorney, Agent, or Firm* — Schwegman Lundberg & Woessner, P.A.

(57) ABSTRACT

Video of customer faces during checkouts are captured in real time and analyzed to assign identifiers for expressions of the customers. Simultaneously, transaction data and events being raised for the checkouts are correlated based on time stamps with the expression identifiers. A collection of data captured for the correlated transaction data, events, and identifiers are processed by a machine-learning algorithm to identify clusters and/or patterns between the expression identifiers and specific transaction events. The clusters are mined and reported to a retailer for identifying points during the workflow for the checkouts, transaction interface components, transaction terminal settings, transaction terminal peripherals, etc. that are potentially causing negative customer reactions during the checkouts.

13 Claims, 3 Drawing Sheets

(56) References Cited

U.S. PATENT DOCUMENTS

| | | | | |
|---|---|---|---|---|
| 2013/0191213 A1* | 7/2013 | Beck | ............ | G06Q 30/0207 |
| | | | | 705/14.64 |
| 2014/0249966 A1* | 9/2014 | Zaragoza | ............ | G06Q 30/0635 |
| | | | | 705/26.81 |
| 2016/0180333 A1* | 6/2016 | Leyva | ............ | G06Q 20/363 |
| | | | | 705/41 |
| 2017/0091705 A1* | 3/2017 | Jones | ............ | G06V 30/142 |
| 2018/0084227 A1* | 3/2018 | Migdal | ............ | G08B 13/19682 |
| 2019/0251571 A1* | 8/2019 | O'Reilly | ............ | G06V 40/168 |
| 2020/0104594 A1* | 4/2020 | Zucker | ............ | H04W 4/35 |
| 2020/0104851 A1* | 4/2020 | Agarwal | ............ | G06N 3/084 |
| 2020/0118401 A1* | 4/2020 | Zalewski | ............ | G07G 1/0072 |
| 2020/0193507 A1* | 6/2020 | Glaser | ............ | G06Q 20/203 |
| 2020/0265396 A1* | 8/2020 | Chirakan | ............ | G06Q 20/18 |
| 2020/0349358 A1* | 11/2020 | Kundu | ............ | G06Q 20/403 |

OTHER PUBLICATIONS

C Wu, J Zhang, O Sener, B Selman (Watch-n-patch: unsupervised learning of actions and relations), machine intelligence, 2017—ieeexplore.ieee.org (Year: 2017).*

B Mobasher, R Cooley, J Srivastava (Automatic personalization based on web usage mining), Communications of the ACM, 2000—dl.acm.org (Year: 2000).*

* cited by examiner

SELF-CHECKOUT CUSTOMER EMOTION CORRELATION PROCESSING

BACKGROUND

The retail industry was attempting to transition their customers from cashier-assisted checkouts to self-checkouts before the COVID-19 pandemic hit. During the pandemic and now following the pandemic, retailers were forced by increased customer demand coupled with decreased staffing to accelerate the transition. Moreover, for health and safety reasons many customers that previously disliked self-checkouts adopted the self-checkouts out of concerns of exposure to the pathogens believed to be present during cashier-assisted checkouts.

Additionally, retailers continue to struggle with staffing issues. During the pandemic, many employees were either on sick leave, found other higher paying jobs, and/or left the workforce entirely. This situation accelerated the planned transitioning of customers away from cashier-assisted checkouts to self-checkouts.

Still, many customers have resisted self-checkouts and the customers who have adopted self-checkouts find many things about the process frustrating and unappealing. For example, the self-checkout countertop does not have a large enough surface area to handle larger checkouts, the Self-Service Terminal (SST) forces attendant interventions too frequently, an item must be moved from the customer's hand over a scanner and placed in a bag on a bagging scale and if not followed correctly the SST forces an intervention, alcohol and tobacco purchases automatically force an interruption for an attendant to check the age of the customer, etc.

These are known and easily observable customer issues with self-checkouts but there are potentially many more issues that are as of yet unknown. Very little investigation has been done in the industry to discover and to address these potentially unknown issues. The prominent solution used to discover negative customer reactions during self-checkouts is customer surveys. Customers are not likely to take a survey following a self-checkout as they are eager to leave the store with their items. Surveys given randomly and not close in time to customer self-checkouts are frequently unreliable and customer participate rates are extremely low.

SUMMARY

In various embodiments, methods and a system for self-checkout customer emotion correlation processing are presented.

According to an aspect, a method for self-checkout customer emotion correlation processing is presented. Video of a face of a customer is received during a checkout at a transaction terminal. Expression identifiers for expressions detected in the face from the video during the checkout are assigned. Transaction events are received during the checkout from the transaction terminal. The expression identifiers are integrated with the transaction events into a record. The above-noted processing is iterated for additional checkouts of additional customers for the transaction terminal and additional transaction terminals until a preconfigured number of records are obtained in a data set. Clusters of the records are derived from the data set based on features of each record; the features comprise the expression identifiers and the transaction events. The clusters of the records with the corresponding features are provided to identify potential reactions being experienced by the customer and the additional customers during the checkout and the additional checkouts.

DETAILED DESCRIPTION

Figure 1:
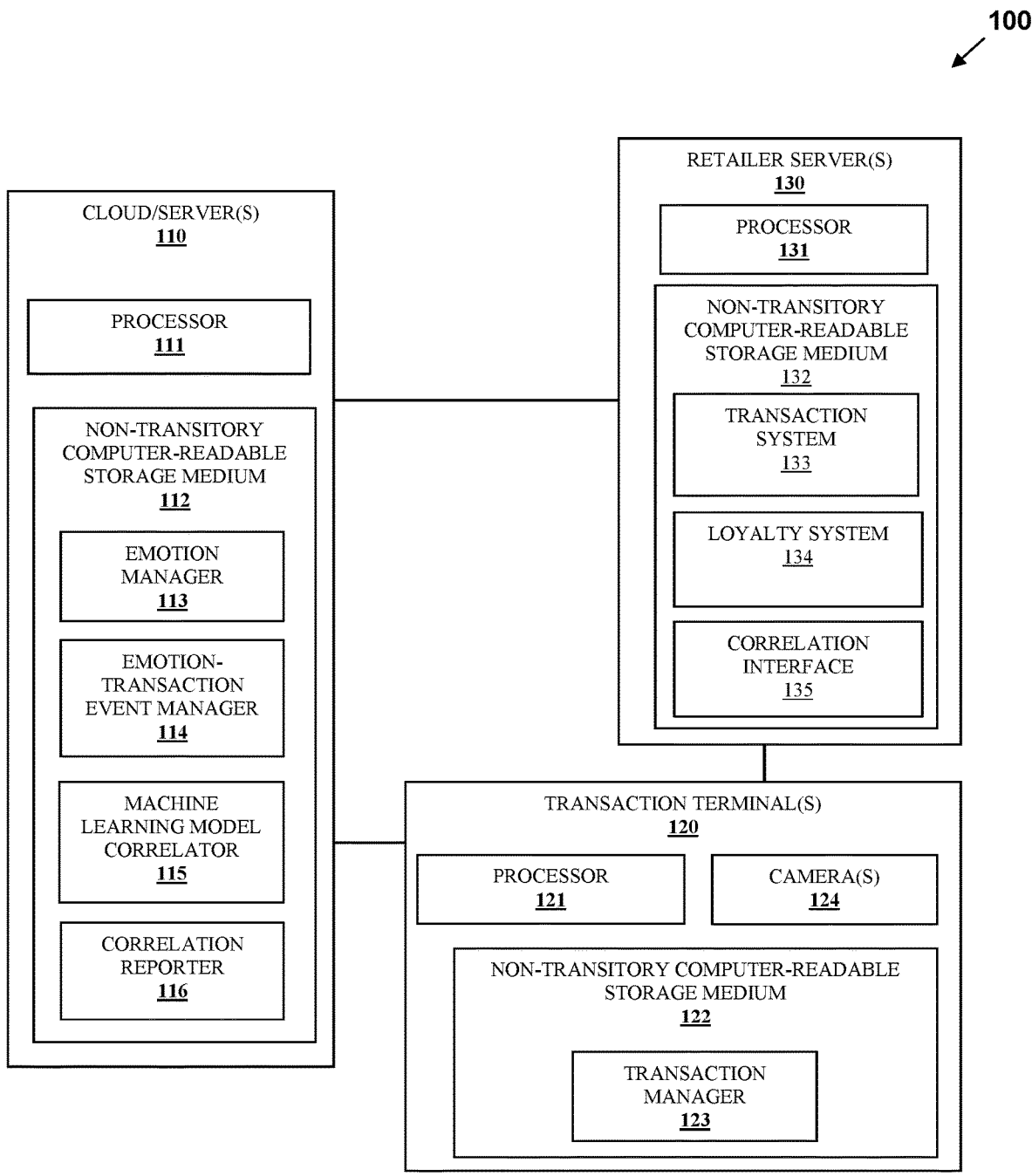
FIG. 1 is a diagram of a system for self-checkout customer emotion correlation processing, according to an example embodiment.

FIG. 1 is a diagram of a system 100 for self-checkout customer emotion correlation processing according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of self-checkout customer emotion correlation processing, presented herein and below.

As will be demonstrated herein, system 100 provides techniques by which the eyes and facial features of a customer during a checkout are tracked from video. The facial features are mapped to predefined emotions or expressions and mapped to emotion/expression identifiers. Transaction information and transaction events are reported in real time as the checkout is processed and mapped based on time stamps to the emotion/expression identifiers. Changes from a current emotion/expression to a different emotion/expression are also noted and mapped to the timestamped transaction events and information.

The labeled transaction information, transaction events, emotion/expression identifiers, and changes in emotions/expressions are processed by an unsupervised data machine-learning model (MLM) that identifies clusters and patterns in the transaction data history of a retailer that correlates/clusters the emotions/expressions or changes in emotions/expressions of the customer with transaction information and events.

Metrics can be gathered for the clusters and patterns and reported out from the MLM. The metrics, clusters, and patterns can reveal specific locations during the checkout process or specific items of the store that are causing negative customer responses.

For example, an item that requires manual lookup may be present within the transaction interface of a retailer for customers to locate but a noticeable number of customers are unable to locate that item by themselves during checkout via the existing transaction interface. This may participate a review of how the item is located within the transaction interface and changes made to the interface so that the particular item is more easily discovered during a checkout by a customer. Subsequent review of the transaction history can also prove whether the change to the interface was or was not successful by a given store.

This is but one of a plethora of examples that system 100 permits discover of by identifying and correlating emotions/expressions and changes in emotions/expressions with transaction events and transaction information during checkouts.

As used herein the term "emotion" and/or expression may be used synonymously and interchangeably. This is intended to me detectable facial attributes of a customer during a checkout that are mapped to emotion/expression identifiers. For example, surprise, anger, confused, frustrated, puzzled, bewilderment, disgust, contempt, fear, sadness, happiness, disgusted, stoic, etc.

As used herein a "transaction event" refers to a state, a status, or an action taken during a checkout (transaction). For example, an event may identify that a transaction (checkout) was initiated, identify that a specific item code was scanned, identify that a loyalty account card was inserted into a card reader or scanned by a scanner, identify that payment processing was requested to finish the checkout, identify that an item weight for an item requiring a weight was reported, identify that a transaction interface option associated with manually looking up and entering an item code was selected during the checkout, identify that a specific intervention was raised during the checkout, identity a specific type of intervention raised during the checkout, identify that payment was received, identify that a receipt was printed to conclude the checkout, etc.

It is within this context that various embodiments are now discussed beginning with system 100 of FIG. 1.

System 100 comprises at least one cloud/server 110, a transaction terminal 120, and a retailer server 130.

Cloud/server 110 comprises a processor and a non-transitory computer-readable storage medium 112. Medium 112 comprises executable instructions for an emotion manager 113, an emotion-transaction event manager 114, a MLM correlator 115, and a correlation reporter 116. When the executable instructions are executed by processor 111, this causes processor 111 to perform operations discussed herein and below with respect to 113-116.

Each transaction terminal 120 (herein after just "terminal 120") comprises at least one processor 121, a non-transitory computer-readable storage medium 122, and at least one customer-facing camera 124. Medium 122 comprises executable instructions for a transaction manager 123. When the executable instructions are executed by processor 121 from medium 122, this causes processor 121 to perform operations discussed herein and below with respect to 123.

Each retailer server 130 comprises a processor 131 and a non-transitory computer-readable storage medium 132. Medium 132 comprises executable instructions for a transaction system 133, a loyalty system 134, and a correlation interface 135. When the executable instructions are executed by processor 131 from medium 132, this causes processor 131 to perform operations discussed herein and below with respect to 133-135.

Initially, camera 124 is oriented and focused to capture video of a face of a customer at terminal 120. The images of the video are streamed in real time to a network-accessible location accessible to emotion manager 113. Similarly, transaction manager 123 streams or stores the transaction events with corresponding transaction information (details) to a transaction log accessible to emotion-transaction event manager 114.

Image frames of the video for a customer face during a checkout are obtained by emotion manager 113. The image frames are time stamped and associated with a specific terminal identifier for the terminal 120. Eyes and facial features of the customer are tracked from frame to frame.

Each frame is scored based on the detected facial features and each score is mapped to a specific emotion/expression identifier, each emotion/expression identifier assigned a model score or a model range of scores. Alternatively, a trained MLM may be processed to track and assign predefined emotion/expression identifiers for each frame passes as input to the trained MLM.

Emotion-transaction event manager 114 receives the transaction event stream from the transaction log and assigns the image frames with the corresponding emotion/expression identifiers to the appropriate transaction event based on a time stamp of the corresponding event and a time stamp of the corresponding image frame. The events and information from the transaction log along with the integrated emotion/expression identifiers mapped to the events are saved in a transaction emotion history data store.

The transaction emotion history data store is allowed to accumulate over a predefined number of transactions (checkouts) across multiple different terminals 120 for a given store of a retailer. The transaction emotion history data store essentially represents a features labeled data set, labeled with terminal identifiers, transaction identifiers, event identifiers and corresponding information associated with each event identifier, time stamps, and customer emotion/expression identifiers. Each record within the labeled data set represents a single checkout/transaction at a given terminal for a given store on a given calendar date and at a given time of day. Each record comprises features/labels corresponding to its set of transaction events and corresponding transaction information and the integrated (based on time stamps) customer emotion/express identifiers.

The labeled data set records are then passed as input to an unsupervised data MLM correlator 115, which processes a clustering or pattern-based algorithm to use the features for each record and derive clusters of related records together and identify patterns associated with the features. In an embodiment, MLM correlator 115 processes an algorithm for K-Means clustering, connectivity-based clustering, centroids-based clustering, distribution-based clustering, fuzzy clustering, or constraint-based clustering.

The output from the MLM correlator 115 is sets of clustered features, each feature associated with a given input record. The most frequently identified cluster can be readily identified along with the least frequently occurring cluster. Correlation reporter 116 can be used to mine the outputted clusters/patterns for clusters associated with specific stores, specific emotion/expression identifiers, specific transaction events, or any combination of these data features.

Correlation Interface 135 permits a retailer to interact with correlation reporter 116 to receive the clusters of features or generate on-demand reports for specific feature criteria entered by the retailer through the correlation interface 135 and processed by correlation reporter against the sets of clustered features.

A variety of reported clusters and/or feature-specific criteria mined via interface 135 and reporter 116 can reveal specific areas within a transaction interface associated with transaction manager 123 that require modification to improve a customer's view towards the checkout. Moreover, specific points in a workflow for a given transaction can reveal areas that need improvement. Still further, specific information about a specific item can be revealed as problematic. In fact, the correlations between the customer's emotions/expressions and the transaction (checkout) can reveal areas that require redesign or improvement that were previously unknown.

For example, suppose that identifiers for anger and frustration are clustered in a cluster with a transaction event associated with manually entering an item code for an item during checkout. The retailer inspects the item code lookup screens and detects that a common-sense search word was missing for the item in the item lookup interface table even though such a search term is how customers commonly refer to the item as opposed to its highly esoteric actual name. A simple addition of the search word to a search index of the interface can solve this issue.

As another example, suppose that identifiers for surprise and puzzlement are clustered in a cluster with a transaction event associated with manually enter your loyalty code. The retailer receives the reports and discovers that the transaction interface screens associated with this state of the transaction interface brings up an alphabetic keyboard screen that lacks any indication as to how to get to numbers from the keyboard. The retailer changes the transaction interface screen to default to bring up a numeric keypad when the transaction interface enters a manually enter loyalty code state.

In yet another example, suppose that identifiers for frustration and bewilderment are clustered in a cluster with a transaction event associated with an interruption for bag weight mismatch or item weight not detected in bag weigh area. Additionally, the cluster includes only a specific store or one or two terminal identifiers for the store. The retailer may inspect the settings and calibration of the bag weigh scales at the given store or at the specific terminals and identify that the sensitive was set too high, such that customers were getting frustrated during checkouts.

In another example, suppose that identifiers for shock are clustered in a cluster with a transaction event associated with item scanning on a specific terminal 130. When the retailer inspects the terminal 130 and test scans items, the retailer discovers the volume for the feedback beep after a scan on the terminal is set way to high for customer comfort and corresponding reduces the feedback beep volume to solve the customers frustrations.

After each identified area of detected negative customer emotional feedback is identified and changes are made accordingly, the retailer can determine if the changes were successful or not by having transaction data associated with checkouts after the changes were made processed through MLM correlator 115 and inspecting the clusters for the features using interface 135 to interact and request the clusters from reporter 116. If the problem clusters no longer exists, the retailer knows that the changes were successful. If the problem clusters still exists but with much lower frequency, the retailer may want to further inspect the other features of the problem cluster to see if an additional issue is also being attributed to this particular cluster, which the retailer did not identify before.

The MLM correlator 115 may be processed by the retailer at retailer defined intervals of time and/or on demand through interaction with reporter 116 through interface 135. Moreover, MLM correlator 115 can be instructed to just process incremental transaction data since it last performed clustering on the transaction data, instructed to reprocess all available transaction data at a given point in time, and/or instructed to reprocess transaction data defined within a retailer-defined interval of time through interface 135 and interaction with reporter 116.

In an embodiment, MLM correlator 115 is processed in real time during a customer transaction as the video and the transaction events are detected, the feature labeled data is fed in real time to MLM correlator 115 which returns a cluster identifier for a cluster to which the transaction (checkout) belongs. The cluster identifier and the other features of the corresponding cluster is reported in real time by reporter 116 to correlation interface 135. An operator of correlation interface 135 may raise an alert causing an intervention on transaction manager 123 and attendant is dispatched to resolve or provide advice on a probable issue that the customer is having during the transaction and before the customer leaves the store. In an embodiment, the alert may initiate a workflow that causes a popup message to be displayed within the transaction interface by transaction manager 123. The message may provide the advice for resolving the customer's perceived issue during the checkout. Thus, system 100 may be processed in batch modes and in a real-time mode to timely address negative reactions of customers during checkouts.

In an embodiment, the clusters derived for the records are maintained in a data model. The data model can be updated through interface 135 with proposed fixes to resolve problems experienced by the customers linked to the corresponding clusters or identify moments of joy as a positive thing. The data model may also maintain metrics for the clusters, such as a frequency count of each feature within a given cluster, a frequency count of each cluster (total number of records associated with the corresponding cluster), etc. Thus, the data model can have information added to it for given clusters, given terminals, given features, can include metrics, and can be continuously updated. Access to the data model for mining and reporting is provided through interaction of interface 135 with reporter 116.

In an embodiment, the transaction terminal 120 is a self-service terminal that processes through transaction manager 123 self-checkouts for customers.

In an embodiment, transaction terminal 120 is an Automated Teller Machine (ATM) that processes self financial transactions as directed by a customer. Here, the transaction events would correspond to financial transaction events and the workflow would correspond to different types of financial transactions (see balance, transfer funds, withdraw funds, deposit funds, etc.).

In an embodiment, transaction terminal 120 is a Point-Of-Sale (POS) terminal associated with cashier-assisted checkouts of a customer. In this embodiment, terminal 120 may comprise two cameras 124 one directed on the customer, and one directed on the cashier. The emotion manager 113 receives two video feeds and assigns emotion/expression identifiers for both the customer and the cashier. The clusters produced by MLM 115 may reveal a particular cashier is problematic with customers, the video feeds may be reviewed to reveal that the cashier is unpleasant and aggressive with the customers. The clusters may also reveal that particular aspects of the cashier-assisted transaction interface screens are problematic particularly for newer cashiers. In fact, the clusters may reveal cashiers that need training, etc.

In an embodiment, components 113-116 may be subsumed and reside on the retailer server 130.

In an embodiment, reporter 116 reports the clusters to loyalty system 135 and/or transaction system 133 as a Software-as-a-Service (SaaS) through an Application Programming Interface (API).

The above-noted embodiments and other embodiments are now discussed with reference to FIGS. 2-3.

Figure 2:
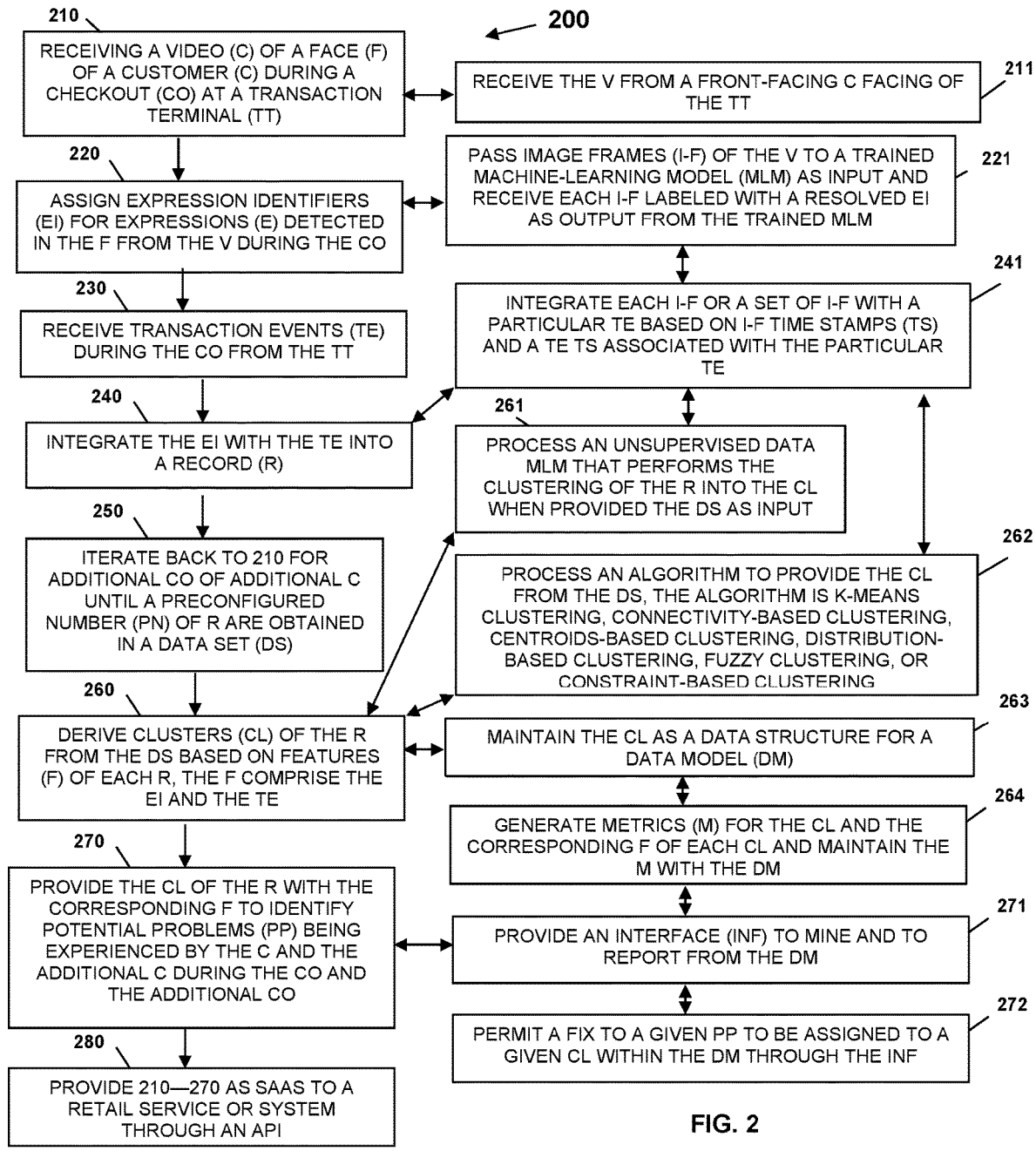
FIG. 2 is a diagram of a method for self-checkout customer emotion correlation processing, according to an example embodiment.

FIG. 2 is a diagram of a method 200 for self-checkout customer emotion correlation processing, according to an example embodiment. The software module(s) that implements the method 200 is referred to as a "terminal-customer checkout analyzer." The terminal-customer checkout analyzer is implemented as executable instructions programmed and residing within memory and/or a non-transitory computer-readable (processor-readable) storage medium and executed by one or more processors of a device or set of devices. The processor(s) of the device(s) that executes the terminal-customer checkout analyzer are specifically configured and programmed to process the terminal-customer checkout analyzer. The terminal-customer checkout analyzer may have access to one or more network connections during its processing. The network connections can be wired, wireless, or a combination of wired and wireless.

In an embodiment, the terminal-customer checkout analyzer executes on server 110. In an embodiment, the server 110 is one of several servers logically presenting and cooperating as a single server representing a cloud 110 or a cloud processing environment 110.

In an embodiment, the terminal-customer checkout analyzer executes on a retailer server 130.

In an embodiment, the terminal-customer checkout analyzer is one, all, or some combination of 113-116.

At 210, terminal-customer checkout analyzer receives a video of a face of a customer during a checkout at a transaction terminal 120.

In an embodiment, at 211, the terminal-customer checkout analyzer receives the video from a front-facing camera 124 of the transaction terminal 120.

At 220, the terminal-customer checkout analyzer assigns expression identifiers for expressions detected in the face from the video during the checkout.

In an embodiment, the terminal-customer checkout analyzer passes image frames of the video to a trained MLM as input and receives each image frame labeled with a resolved expression identifier as output from the trained MLM.

In an embodiment, the terminal-customer checkout analyzer processes a facial recognition algorithm that tracks the eyes and facial features, scores the features, and maps the scores to specific expression identifiers.

At 230, the terminal-customer checkout analyzer receives transaction events during the checkout from the transaction terminal 120.

At 240, the terminal-customer checkout analyzer integrates the expression identifiers with the transaction events into a record that corresponds to the checkout.

In an embodiment of 221 and 240, at 241, integrates each image frame or a set of image-frames with a particular transaction event based on image-frame time stamps and a transaction event time stamp associated with the particular transaction event. Essentially, the expression identifiers are synchronized with the transaction events and maintained in an integrated fashion within the record.

At 250, the terminal-customer checkout analyzer iterates back to 210 for additional checkouts of additional customers until a preconfigured number of records are generated or obtained within a data set.

At 260, the terminal-customer checkout analyzer derives clusters of the records from the data set based on features of each record. The features comprise the expression identifiers and the transaction events.

In an embodiment of 241 and 260, at 261, the terminal-customer checkout analyzer processes an unsupervised data MLM 115 that performs the clustering of the records into the clusters when the MLM 115 is provided the data set as input.

In an embodiment of 241 and 260, at 262, the terminal-customer checkout analyzer processes a clustering algorithm to obtain or to provide the clusters from the data set. The clustering algorithm is a K-Means clustering algorithm, a connectivity-based clustering algorithm, a centroids-based clustering algorithm, a distribution-based clustering algorithm, a fuzzy clustering algorithm, or a constraint-based clustering algorithm.

In an embodiment, at 263, the terminal-customer checkout analyzer maintains the clusters as a data structure for a data model.

In an embodiment of 263 and at 264, the terminal-customer checkout analyzer generates metrics for the clusters and the corresponding features of each cluster and maintains the metrics within the data model.

At 270, the terminal-customer checkout analyzer provides the clusters of the records with the corresponding features to identify potential reactions (positive or negative, such as a problem) being experienced by the customers and the additional customers during the checkout and the additional checkouts.

In an embodiment of 264 and 270, at 271, the terminal-customer checkout analyzer provides an interface 135 to mine and to report from the data model.

In an embodiment of 271 and at 272, the terminal-customer checkout analyzer permits a fix to a given potential problem to be assigned to a given cluster within the data model through the interface.

In an embodiment, at 280, the terminal-customer checkout analyzer is processed and/or provided as a Software-as-a-Service (SaaS) to a retail service of a retail system 133 and/or 134.

Figure 3:
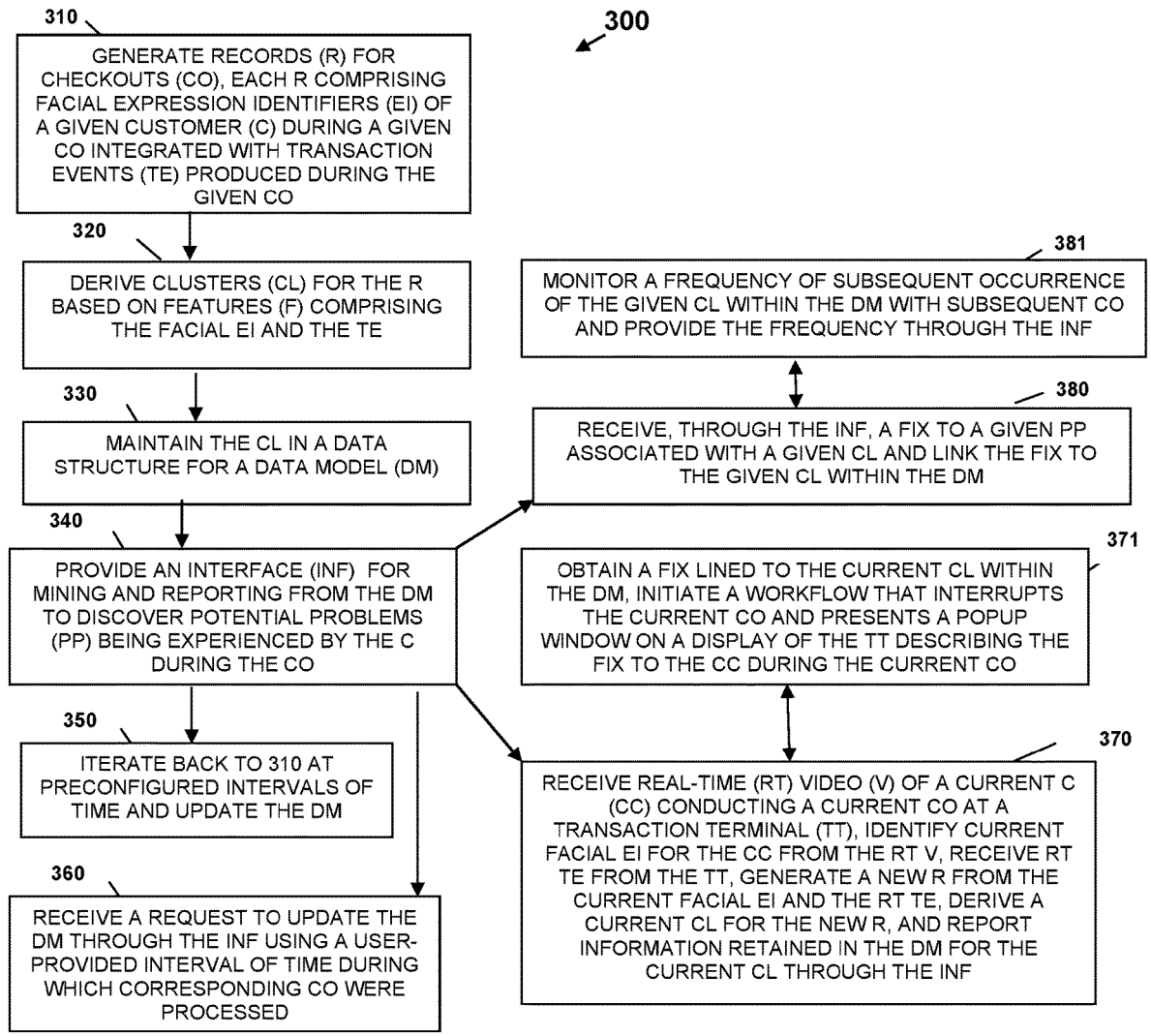
FIG. 3 is a diagram of another method for self-checkout customer emotion correlation processing, according to an example embodiment

FIG. 3 is a diagram of a method 300 for self-checkout customer emotion correlation processing, according to an example embodiment. The software module(s) that implements the method 300 is referred to as a "customer-expression checkout correlator." The customer-expression checkout correlator is implemented as executable instructions programmed and residing within memory and/or a non-transitory computer-readable (processor-readable) storage medium and executed by one or more processors of a device or set of devices. The processor(s) of the device that executes the customer-expression checkout correlator are specifically configured and programmed to process the connecting device pairing manager. The customer-expression checkout correlator may have access to one or more network connections during its processing. The network connections can be wired, wireless, or a combination of wired and wireless.

In an embodiment, the device that executes the customer-expression checkout correlator is a server 110.

In an embodiment, the device that executes the customer-expression checkout correlator is a plurality of servers cooperating as a single cloud 110.

In an embodiment, the customer-expression checkout correlator is a retailer server 130.

In an embodiment, the customer-expression checkout correlator is all of, or some combination of, 113, 114, 115, 116, and/or method 200.

The customer-expression checkout correlator presents another, and in some ways, enhanced processing prospective to that which was discussed above with method 200 of FIG. 2.

At 310, customer-expression checkout correlator generates records for checkouts, each record comprising facial expression identifiers of a given customer during a given checkout with transaction events produced during the given checkout. This can be achieved in any of the above-referenced techniques to assign the facial expression identifiers and synchronize the expression identifiers for the transaction events within the records. Each record representing a given checkout.

At 320, the customer-expression checkout correlator derives clusters or patterns for the records based on features. The features comprise the facial expression identifiers and the transaction events (as well as any transaction information associated with each transaction event).

At 330, the customer-expression checkout correlator maintains the clusters in a data structure for a data model.

At 340, the customer-expression checkout correlator provides an interface 135 for mining and reporting from the data model to discover potential reactions (positive or negative (problems) being experienced by the customers during the checkouts.

In an embodiment, at 350, the customer-expression checkout correlator iterates back to 310 at preconfigured intervals or time and updates the data model.

In an embodiment, at 360, the customer-expression checkout correlator receives a request to update the data model through the interface 135 using a user-provided interval of time during which corresponding checkouts were processed.

In an embodiment, at 370, the customer-expression checkout correlator receives real-time video of a current customer conducting a current checkout at a transaction terminal 120. The customer-expression checkout correlator identifies current facial expression identifiers for the current customer from the real-time video and receives real-time transaction events from the transaction terminal 120 for the current checkout. The customer-expression checkout correlator generates a new record from the current facial expression identifiers and the real-time transaction events. The customer-expression checkout correlator customer-expression checkout correlator derives a current cluster for the new record and reports information retained in the data model for the current cluster through the interface 135.

In an embodiment of 370 and at 371, the customer-expression checkout correlator obtains a fix to the current cluster within the data model and initiates a workflow that interrupts the current checkout and presents a popup window on a display of the transaction terminal 120 describing the fix to the current customer during the current checkout.

In an embodiment, at 380, the customer-expression checkout correlator receives, through the interface 135, a fix to a given potential problem associated with a given cluster and the customer-expression checkout correlator links the fix to the given cluster within the data model.

In an embodiment of 380 and at 381, the customer-expression checkout correlator monitors a frequency of subsequent occurrences of the given cluster within the data model with subsequent checkouts and provides the frequency through the interface 135. Thus, fixes identified from the data model can be monitored to see if they are working or not and if not, a different fix can be tried and monitored.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving video of a face of a customer during a checkout at a transaction terminal, wherein the video captured by a front-facing customer camera;
assigning expression identifiers for expressions detected in the face from the video during the checkout by processing a trained unsupervised machine learning model (MLM) that provides the expression identifiers as output;
receiving, in real time, transaction events during the checkout from the transaction terminal, which is processing the checkout;
integrating and synchronizing, in real time, the expression identifiers with the transaction events compiled into a record;
iterating to the receiving of the video for additional checkouts of additional customers for the transaction terminal and additional transaction terminals until a preconfigured number of records are obtained in a data set;
deriving clusters of the records from the data set based on features of each record by processing a clustering algorithm against the records, wherein the features comprise the expression identifiers and the transaction events, wherein each cluster represents patterns in customer reactions correlated with specific transaction events;
providing and outputting the clusters of the records with the corresponding features to adjust transaction processes and to enhance subsequent customer transaction experiences by identification of potential reactions being experienced by the customer and the additional customers during the checkout and the additional checkouts;
detecting, in real time, a negative customer expression for a particular customer based on a particular expression identifier provided by the trained unsupervised MLM during a particular checkout and based on a particular cluster associated with the negative customer expression; and
initiating a workflow that interrupts the particular checkout and presents a popup window on a display of the transaction terminal within a transaction interface, wherein the popup window describes a particular fix to the particular customer during the particular checkout to resolve a particular problem the particular customer is experiencing based on the negative customer expression;

wherein deriving further includes maintaining the clusters as a data structure for a data model;

wherein maintaining further includes generating metrics for the clusters and the corresponding features of each cluster and maintaining the metrics with the data model;

wherein providing further includes providing an interface to mine and to report from the data model;

wherein providing the interface further includes assigning a fix to a given potential problem to be assigned to a given cluster within the data model through the interface;

wherein the particular fix is linked to the particular cluster within the data model.

2. The method of claim 1, wherein the front-facing customer camera is directed to the face of the customer during the checkout at the transaction terminal.

3. The method of claim 1, wherein assigning further includes passing image frames of the video to the trained unsupervised MLM as input and receiving each image frame labeled with a resolved expression identifier as output from the trained unsupervised MLM.

4. The method of claim 3, wherein integrating further includes integrating each image frame or a set of image frames with a particular transaction event within the record based on image frame time stamps and a transaction event time stamp associated with the particular transaction event.

5. The method of claim 4, wherein deriving the clustering algorithm is a second MLM that clusters the records into the clusters when provided the data set as input.

6. The method of claim 4, wherein the clustering algorithm is K-Means clustering algorithm, connectivity-based clustering algorithm, centroids-based clustering algorithm, distribution-based clustering algorithm, fuzzy clustering algorithm, or constraint-based clustering algorithm.

7. The method of claim 1 further comprising, providing the method as a Software-as-a-Service (SaaS) to a retail service or a retail system through an Application Programming Interface (API).

8. A method, comprising:

generating records for each of a plurality of checkouts, each record integrating facial expression identifiers, derived from real-time video analysis of a face associated with a customer, with transaction events occurring during a checkout;

deriving clusters for the records based on features comprising the facial expression identifiers and the transaction events by processing an unsupervised machine learning model to analyze the records to derive the clusters;

maintaining the clusters within a data structure that facilitates querying and analysis;

providing a user interface that allows retail managers to access and interrupt the clusters to identify and address points of customer dissatisfaction or confusion by mining and reporting from the data model to discover potential reactions being experienced by the customers during the checkouts;

iterating to the generating at preconfigured intervals of time and updating the data model;

receiving real-time video of a current customer conducting a current checkout at a transaction terminal, identifying current facial expression identifiers for the current customer from the real-time video, receiving real-time transaction events from the transaction terminal, generating a new record from the current facial feature expression identifiers and the real-time transaction events, deriving a current cluster for the new record, and reporting information retained in the data model for the current cluster through the interface;

detecting, in real time, a negative customer expression for a particular customer based on a particular facial expression identifier provided by the trained unsupervised MLM during a particular checkout and based on a particular cluster associated with the negative customer expression; and initiating a workflow that interrupts the particular checkout and presents a popup window on a display of the transaction terminal within a transaction interface, wherein the popup window describes a particular fix to the particular customer during the particular checkout to resolve a particular problem the particular customer is experiencing based on the negative customer expression, wherein the particular fix is linked to the particular cluster within the data model.

9. The method of claim 8 further comprising, receiving a request to update the data model through the user interface using a user-defined provided interval of time during which corresponding checkouts were processed.

10. The method of claim 8 further comprising, receiving, through the interface, a fix to a given potential problem associated with a given cluster and linking the fix to the given cluster within the data model.

11. The method of claim 10 further comprising, monitoring a frequency of subsequent occurrence of the given cluster within the data model with subsequent checkouts and providing the frequency through the interface.

12. A system, comprising:

a server configured with a processor and memory storing instructions for:

receiving and processing video data and transaction events from transaction terminals by extracting facial expressions of customers during checkouts at the transaction terminals from the video data and correlating facial expressions of the customers defined by the facial expressions with the transaction events, wherein the video data is processed by a trained unsupervised machine learning model to obtain the facial expression identifiers;

maintaining a data model based on processing the video data, wherein the data model comprises clusters of records, each record representing a particular checkout at a particular transaction terminal and each record comprises corresponding facial expression identifiers for facial expressions of a corresponding customer during the particular checkout synchronized with corresponding transaction events raised by the particular transaction terminal during the particular checkout;

providing a reporting and user interface that allows users to extract actionable insights from the data model to improve customer experiences in subsequent checkouts at the transaction terminals through mining and reporting from the data model to discover potential reactions being experienced by the customers during the checkouts;

updating the data model for new checkouts based on one or more of:

a preconfigured interval of time is reached, a predefined number of the new checkouts is reached, and on demand after receiving an update request through the reporting and user interface detecting, in real time, a negative customer expression for a given customer based on a given facial expression identifier provided by the trained unsupervised MLM during a given checkout and based on a given cluster associated with the negative customer expression; and initiating a workflow that interrupts the given checkout and presents a popup window on a display of a given transaction terminal within a transaction interface, wherein the popup window describes a particular fix to the given customer during the given checkout to resolve a given problem the given customer is experiencing based on the negative customer expression, wherein the particular fix is linked to the given cluster within the data model.

13. The system of claim 12, wherein the transaction terminal is an Automated Teller Machine (ATM), a Self-Service Terminal (SST) for self-checkouts, of a Point-Of-Sale (POS) terminal for cashier-assisted checkouts.

* * * * *